United States Patent [19]

Andres

[11] 4,142,692
[45] Mar. 6, 1979

[54] REEL MECHANISM FOR ELIMINATION OF BELT LOOSENESS OF A SAFETY BELT SYSTEM

[75] Inventor: Rudolf Andres, Sindelfingen, Fed. Rep. of Germany

[73] Assignee: Daimler-Benz Aktiengesellschaft, Fed. Rep. of Germany

[21] Appl. No.: 803,385

[22] Filed: Jun. 3, 1977

[30] Foreign Application Priority Data

Jun. 5, 1976 [DE] Fed. Rep. of Germany ....... 2625573

[51] Int. Cl.² ..................... A62B 35/00; B65H 75/48
[52] U.S. Cl. ............................ 242/107; 242/107.4 R; 244/122 B; 280/744
[58] Field of Search ............... 240/107.4 R, 107.4 E, 240/107, 107.3; 180/82 C; 280/744–747; 297/388; 244/122 B

[56] References Cited

U.S. PATENT DOCUMENTS 3,871,470  3/1975  Schwanz et al. ............. 242/107.4 R
3,976,257  8/1976  Fohl ................................. 242/107 X
4,014,479  3/1977  Nilsson et al. ............. 242/107.4 A X
4,056,242  11/1977 Herrmann ................. 242/107.4 A X Primary Examiner—Harvey C. Hornsby
Assistant Examiner—John M. Jillions
Attorney, Agent, or Firm—Craig & Antonelli

[57] ABSTRACT

A reel mechanism for the elimination of the belt looseness of a safety belt system when exceeding a predetermined vehicle deceleration, whereby a preferably electrically ignitable propellant charge is provided for the initiation of the retraction movement, which is arranged in the axial direction of the wind-up roller; the propellant charge is thereby arranged concentrically in a hollow shaft of a belt roller that blocks automatically in case of danger, and accommodates a continuously effective retracting device as well as the wind-up roller; a liquid medium is disposed in front of the propellant charge which, after the ignition of the propellant charge, drives a rotor coupled at that instant with the wind-up roller by the then forming gases in the sense of an elimination of the belt looseness.

26 Claims, 1 Drawing Figure

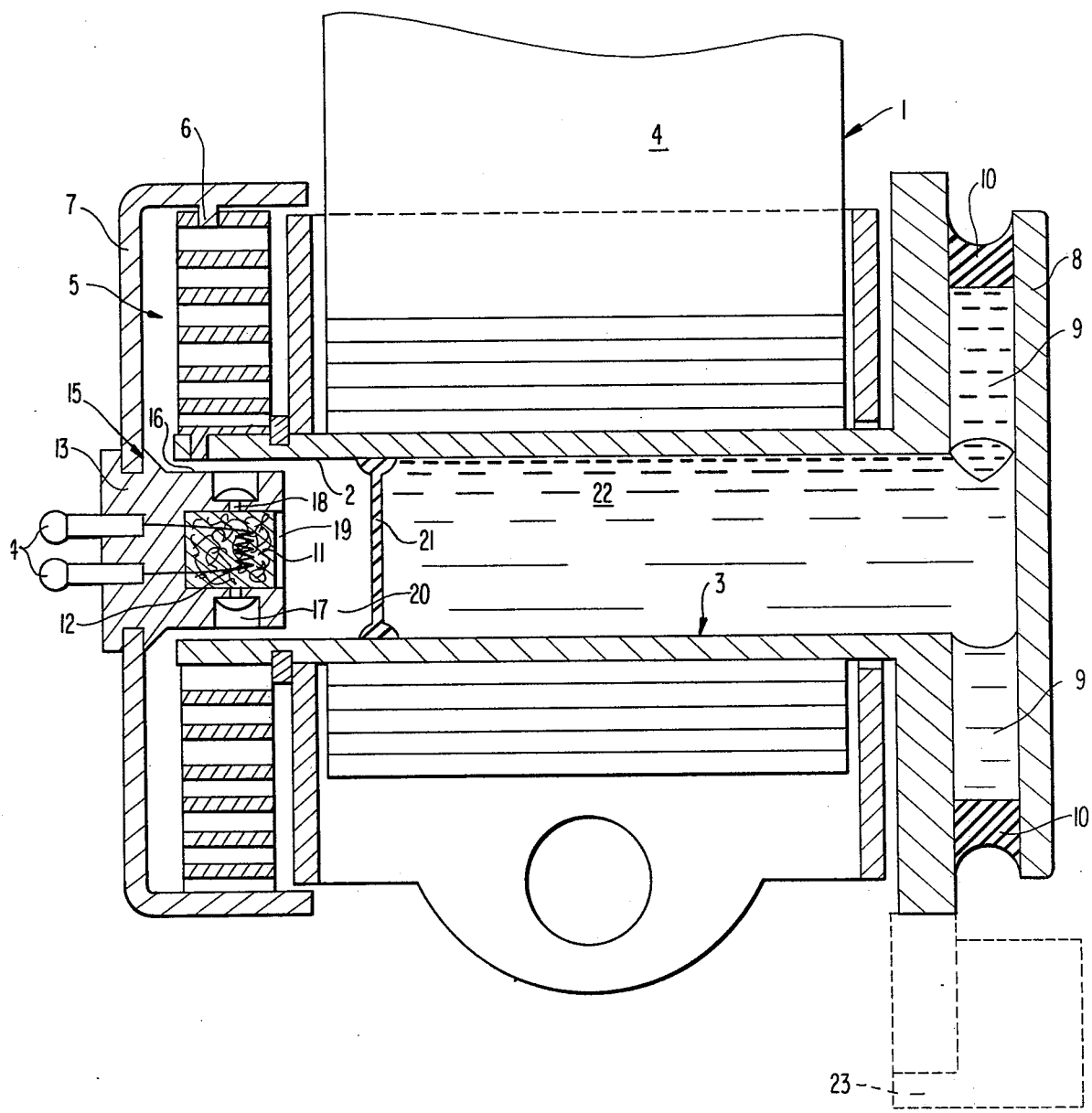

REEL MECHANISM FOR ELIMINATION OF BELT LOOSENESS OF A SAFETY BELT SYSTEM

The present invention relates to a reel mechanism for the elimination of the belt looseness of a safety belt system when exceeding a predetermined vehicle deceleration, whereby a preferably electrically ignitable propellant charge, arranged in the axial direction of the wind-up roller is provided for the initiation of the pulling-back or retracting movement.

Such an installation is disclosed in the German Auslegeschrift 2,262,889, whereby a rotary piston acted upon by propellant gases is provided which acts on the wind-up roller. Since the rotary piston cannot carry out a complete revolution, it is necessary to select the diameter of the wind-up roller very large in order that a correspondingly large amount of belt band can be reeled-up. Additionally, the engaging surface for the propellant gas on the side of the piston must be relatively large in order that the tensioning operation is completed within the short period of time that is available. Consequently, a large structural part necessarily results therefrom which cannot be accommodated without further measures, for example, in the center column of a motor vehicle.

It is therefore the task of the present invention to create a possibility to so reduce the reel mechanism in its dimensions while preserving its required functioning ability that it can be used easily at any desired location of a motor vehicle and can be used especially also in conjunction with an automatic belt.

Accordingly, a reel mechanism of the aforementioned type is proposed, whereby according to the present invention the propellant charge is arranged concentrically within the course of the hollow shaft of a belt roller automatically locking in case of danger which accommodates a continuously effective retracting device and the wind-up roller, and whereby a liquid medium is connected in the output of the propellant charge, which after the ignition of the propellant charge drives a rotor coupled at that instant with the wind-up roller by the then forming gases in the sense of an elimination of the belt looseness.

In a preferred embodiment of the present invention, the rotor is arranged coaxially to the wind-up roller and is acted upon from the inside toward the outside.

According to a further feature of the present invention, the fluid medium is prevented from escaping during the normal driving operation by plugs which close off the discharge channels of the rotor and are adapted to be pressed-out.

It may be of advantage if the locking mechanism which prevents a belt pull-out in case of danger acts on the rotor that rotates together with the wind-up roller.

A favorable construction results if the rotor and the wind-up roller form a structural unit.

The dimensions can be kept small if the rotor accommodates the retracting device.

A simple assembly operation exists if the propellant charge together with the ignition device is adapted to be fixed, for example, by means of a snap-in connection, at the belt roller housing fixed at the vehicle, and projects into the hollow shaft.

In another embodiment of the present invention, an insert receiving the propellant charge includes along its outer surface a circumferential seal which is being pressed by the propellant gases against the walls of the hollow shaft.

Finally, it may be of advantage if a hollow space is located between the propellant charge and the liquid medium, which is separated with respect to the propellant charge by a baffle disk and with respect to the liquid medium, for example, by a piston. A type of diffuser can thus be created in a simple manner in case of need.

Accordingly, it is an object of the present invention to provide a reel mechanism for the elimination of the belt looseness of a safety belt system which avoids by simple means the aforementioned shortcomings and drawbacks encountered in the prior art.

Another object of the present invention resides in a wind-up mechanism for the elimination of the belt looseness of a safety belt system which enables a relatively compact construction that is simple to manufacture and install.

A further object of the present invention resides in a reel mechanism of the type described above which permits a reduction of number and size in the various parts thereof to facilitate the accommodation at any desired location in a motor vehicle.

Still another object of the present invention resides in a wind-up mechansim for the elimination of belt looseness of a safety belt system which results in a favorable construction with relatively small dimensions.

These and other objects, features and advantages of the present invention will become more apparent from the following description when taken in connection with the accompanying drawing which shows, for purposes of illustration only, one embodiment in accordance with the present invention, and wherein:

The single FIGURE is a somewhat schematic cross-sectional view through one embodiment of a reel mechanism in accordance with the present invention for the elimination of belt looseness of a safety belt system.

Referring now to the single FIGURE of the drawing, a belt roller generally designated by reference numeral 1 which is illustrated only in a simplified, somewhat schematic manner, rotatably accommodates a hollow shaft 2 which in its center area serves as wind-up roller 3 for the belt band 4. The wind-up roller 3 is under the constant influence of a retracting device generally designated by reference numeral 5 and constructed as a band spring, whose outer end is anchored together at 6 with a fixed belt roller housing 7.

A rotor 8 is connected with the shaft 2 and forms a structural unit therewith, whereby the rotor 8 is not illustrated in detail since it may be of any conventional construction. The rotor 8 includes outwardly directed discharge or outlet channels 9 which are closed off by plugs 10 adapted to be pressed out to thereby open these channels. A propellant charge 11 and an insert 13 accommodating an ignition device 12 with contact pins 14 extending toward the outside is so secured at the belt roller housing 7 fixed at the vehicle by means of a snap-in connection of any conventional construction and generally designated by reference numeral 15 which is illustrated only schematically, that the ignition device 12 and the propellant charge 11 project into the hollow shaft 2 and the high forces which occur can be safely absorbed. The insert 13 includes along its outer surface 16 a circumferential seal 17 which during normal driving operation has a certain spacing with respect to the inner wall of the shaft 2 and thus exerts no friction influence.

If a sensor (not shown) of conventional construction responds when a predetermined vehicle deceleration is exceeded, then an ignition current is supplied to the ignition device 12 by way of the contact pins 14, whereby the propellant charge 11 burns under development of gases. The gases at first pass through the bores 18 in the insert 13 and act upon the seal 17 which, as a result thereof, abuts against the inner walls of the shaft 2. Simultaneously therewith, also a support at the shaft 2 for securing against axial displacement may take place thereby in a conventional manner (not illustrated). The gas pressure increases rapidly and destroys a baffle disk 19 which delimits a hollow space 20 on one side thereof. The propellant gas now flows into this hollow space 20 and acts on a piston 21 which separates a liquid medium 22, for example, alcohol, that extends up to the plugs 10 of the turning rotor 8. If the gas pressure has reached a predetermined level, then the piston 21 which may also be constructed as a diaphragm, will be displaced whereby simultaneously the plugs 10 are expelled. The liquid medium 22 thereupon exits with a high velocity and imparts to the rotor a pulse that suffices for the rapid wind-up of the belt looseness. After this operation, a conventional blocking mechanism 23, indicated only in dash lines which may be triggered, for example, by a pendulum, becomes operable and blocks the rotor 8 and thus the wind-up roller 3.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A reel mechanism for the elimination of the belt looseness of a safety belt system upon exceeding a predetermined vehicle deceleration, comprising a wind-up roller means, an ignitable propellant charge means for the initiation of a retracting movement of the wind-up roller means, the wind-up roller means having the propellant charge means arranged in an axial direction thereof characterized by:
 a retraction means for continuously effecting the biasing of the wind-up roller means in the belt retraction direction,
 a liquid medium disposed in front of the propellant charge means,
 ignition means for igniting the propellant charge means, and
 a rotor means coupled with the wind-up roller means, whereby, after the igniting of the propellant charge means by the ignition means, the liquid medium drives the rotor means to cause an elimination of the belt looseness.

2. A reel mechanism according to claim 1, characterized by means automatically blocking the belt roller means after a rapid wind-up of the belt looseness is completed.

3. A reel mechanism according to claim 2, characterized in that the propellant charge means is electrically ignitable.

4. A reel mechanism according to claim 2, characterized in that the rotor means is arranged coaxially to the wind-up roller means and is acted upon from the inside toward the outside.

5. A reel mechanism according to claim 4, characterized in that the liquid medium is prevented from escaping during the normal driving operation by plug means closing off discharge channel means of the rotor means.

6. A reel mechanism according to claim 5, characterized in that said plug means are operable to be pressed out by a predetermined pressure of the liquid medium.

7. A reel mechanism according to claim 6, characterized in that the blocking means preventing a belt pull-out, in case the predetermined vehicle deceleration is exceeded, acts on the rotor means which rotates in unison with the wind-up roller means.

8. A reel mechanism according to claim 7, characterized in that the rotor means and the wind-up roller means form a structural unit.

9. A reel mechanism according to claim 8, characterized in that the rotor means is operatively connected to the retraction means by way of the wind-up roller means.

10. A reel mechanism according to claim 9, characterized in that the propellant charge means together with the ignition means is adapted to be fixed at a fixed belt roller housing and projects into a hollow shaft means of the wind-up roller means.

11. A reel mechanism according to claim 10, characterized in that the propellant charge means together with the ignition means are adapted to be fixed at the belt roller housing by a snap-in connection means.

12. A reel mechanism according to claim 10, characterized in that an insert accommodating the propellant charge means includes along its outer surface a circumferential seal which is pressed by the propellant gases against the inner walls of the hollow shaft means.

13. A reel mechanism according to claim 12, characterized in that a hollow space is located between the propellant charge means and the liquid medium which is separated with respect to the propellant charge means by a baffle disk and with respect to the liquid medium.

14. A reel mechanism according to claim 13, characterized in that the hollow space is separated with respect to the liquid medium by a piston means.

15. A reel mechanism according to claim 1, characterized in that the rotor means is arranged coaxially to the wind-up roller means and is acted upon from the inside toward the outside.

16. A reel mechanism according to claim 1, characterized in that the liquid medium is prevented from escaping during the normal driving operation by plug means closing off discharge channel means of the rotor means.

17. A reel mechanism according to claim 16, characterized in that said plug means are operable to be pressed out by a predetermined pressure of the liquid medium.

18. A reel mechanism according to claim 1, characterized in that a blocking means preventing a belt pull-out, in case the predetermined vehicle deceleration is exceeded, acts on the rotor means which rotates in unison with the wind-up roller means.

19. A reel mechanism according to claim 1, characterized in that the rotor means and the wind-up roller means form a structural unit.

20. A reel mechanism according to claim 1, characterized in that the rotor means is operatively connected to the retraction means by way of the wind-up roller means.

21. A reel mechanism according to claim 1, characterized in that the propellant charge means together with the ignition means is adapted to be fixed at a fixed belt roller housing and projects into a hollow shaft means of the wind-up roller means.

22. A reel mechanism according to claim 21, characterized in that the propellant charge means together with the ignition means are adapted to be fixed at the belt roller housing by a snap-in connection means.

23. A reel mechanism according to claim 1, characterized in that an insert accommodating the propellant charge means includes along its outer surface a circumferential seal which is pressed by the propellant gases against the inner walls of a hollow shaft means of the wind-up roller means.

24. A reel mechanism according to claim 1, characterized in that a hollow space is located between the propellant charge means and the liquid medium which is separated with respect to the propellant charge means by a baffle disk and with respect to the liquid medium.

25. A reel mechanism according to claim 24, characterized in that the hollow space is separated with respect to the liquid medium by a piston means.

26. A reel mechanism according to claim 1, characterized in that the propellant charge means is arranged substantially concentrically in a hollow shaft means.

* * * * *